United States Patent [19]

Dan et al.

[11] Patent Number: 4,505,462
[45] Date of Patent: Mar. 19, 1985

[54] ELASTOMERIC SHOCK AND VIBRATION ISOLATOR

[75] Inventors: Takuya Dan; Isao Watanabe; Tomoyuki Kurata, all of Yokohama, Japan

[73] Assignee: Bridgestone Tire Company Limited, Tokyo, Japan

[21] Appl. No.: 432,966

[22] Filed: Oct. 5, 1982

[30] Foreign Application Priority Data

Oct. 9, 1981 [JP] Japan .............................. 56-149465[U]

[51] Int. Cl.³ ............................................... F16F 9/44
[52] U.S. Cl. .................................................. 267/140.2
[58] Field of Search .................. 248/562, 566, 575; 267/140.1, 140.2, 141

[56] References Cited

U.S. PATENT DOCUMENTS

| | | | |
|---|---|---|---|
| 1,734,596 | 11/1929 | Rosenzweig | 267/140.2 |
| 2,421,585 | 6/1947 | Thiry | 267/140.1 |
| 2,535,080 | 12/1950 | Lee | 267/140.1 |
| 2,819,063 | 1/1958 | Neidhart | 267/141 X |
| 3,762,671 | 10/1973 | Schulz | 267/140.2 |

Primary Examiner—Duane A. Reger
Attorney, Agent, or Firm—Parkhurst & Oliff

[57] ABSTRACT

An elastomeric shock and vibration isolator having a ring shaped rubber member in which a space is formed or a ring shaped rubber member having within such an internal space a sealed gas chamber and two liquid chambers filled with liquid which are interconnected through an orifice has a tightening ring on the outer circumference of the ring shaped member. The tightening ring is adjustable to adjust the tightening force against the ring shaped rubber member. The characteristics of a thus constructed elastomeric shock and vibration isolator can be changed to correspond to the position and condition of utilization.

20 Claims, 6 Drawing Figures

ELASTOMERIC SHOCK AND VIBRATION ISOLATOR

BACKGROUND OF THE INVENTION

This invention relates to improvements of elastomeric shock and vibration isolators.

Recently, elastomeric shock and vibration isolators having additional damping action by liquid and/or gas have come into use as the mounting means for engines or the like.

The characteristics of such elastomeric shock and vibration isolators are required to match each mode of vibration where the isolator is applied. It is preferable to create a lower vibration transfer rate for the isolator for both low frequency vibrations having large amplitudes and high frequency vibrations having small amplitudes by adding additional damping capacity for the former, but not the latter.

SUMMARY OF THE INVENTION

An object of the present invention is to provide an elastomeric shock and vibration isolator having a ring shaped rubber member inside which a space is formed and having a tightening ring to control the tightening force against the ring shaped rubber member fitted on the outer circumference of the ring shaped rubber member.

A further object of this invention is to provide an elastomeric shock and vibration isolator having a sealed gas chamber inside the ring shaped rubber member, two liquid chambers holding liquid and connected to each other through an orifice, and having a tightening ring to control the tightening force against the ring shaped rubber member fitted on the outer circumference of the ring shaped rubber member.

The present invention is characterized by making it possible to adjust the tightening force of the tightening ring which is used to suppress the deflection in the radial direction of the ring shaped rubber member.

According to this invention, optimum performance can easily be attained by adjusting the amount of deflection of the ring shaped rubber member depending on the position or condition of application of the elastomeric shock and vibration isolator, since one or more tightening rings which can adjust the tightening force against the ring shaped rubber member are inserted at the outer circumference of the ring shaped rubber member.

Furthermore, in an embodiment wherein a tightening ring is inserted in a ring shaped rubber member of an elastomeric shock and vibration isolator containing liquid and gas, as the tightening force of the tightening ring increase, deflection of the ring shaped rubber member decreases, whereby the amount of liquid passing through the orifice increases; and when the tightening force of the tightening ring decreases, the dynamic spring constant increases for proper damping at high frequencies. Therefore, effective utilization of the additional damping capacity caused by the gas and liquid can be realized and varied according to the position and condition of application.

BRIEF DESCRIPTION OF THE DRAWINGS

With reference to the accompanying drawings.

DESCRIPTION OF THE PREFERRED EMBODIMENTS

Figure 1:
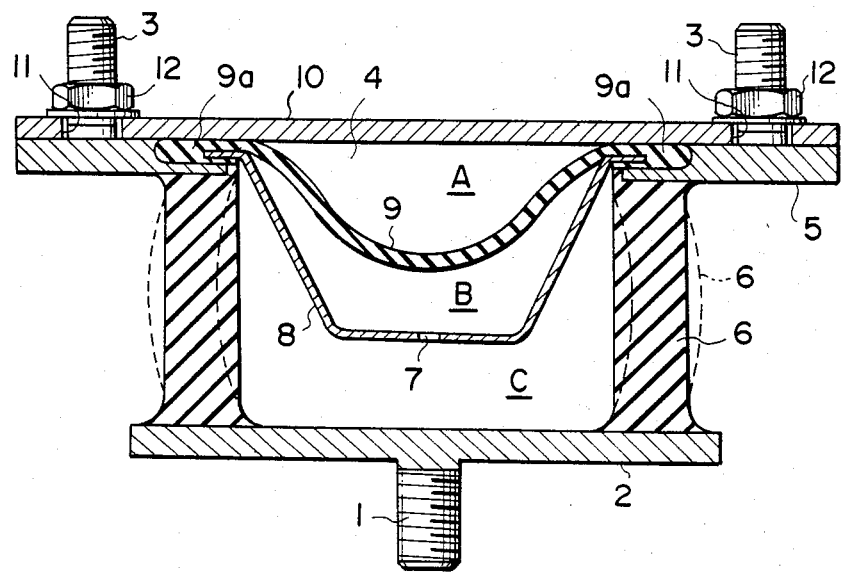
FIG. 1 is a sectional view of an elastomeric shock and vibration isolator containing liquid and gas.

FIG. 1 shows the principal construction of an elastomeric shock and vibration isolator made of rubber and having additional damping action by liquid and gas. The isolator has a lower plate 2 to which a mounting bolt 1 is attached, and an upper plate 5 to which assembly bolts 3 are attached and which has an opening 4 through its center. The plates 2, 5 are arranged at predetermined positions in a mold for vulcanizing rubber such that a cylinder of a vulcanized ring shaped rubber member 6 having a diameter approximately the same as the opening 4 of the upper plate 5 may be formed between the two plates 2, 5.

This cylinder is filled with liquid, and a divider 8 whose central portion protrudes toward the lower plate 2 and has an orifice 7 is mounted on the upper plate 5. A bowl shaped flexible rubber diaphragm 9 is mounted on the upper plate 5 so that the central portion of the diaphragm 9 protrudes toward the orifice 7, and a lid 10 is arranged on a flange 9a of the flexible rubber diaphram 9 to form an air tight volume with the flexible rubber diaphram 9. The lid 10 is fixed to the upper plate 5 by tightening a nut 12 on the assembly bolts 3 of the upper plate 5, which extend through holes 11 in the lid 10. The inside of this isolator thus is divided into 3 chambers (an air chamber A and liquid chambers B and C) by the rubber diaphram 9 and the divider 8.

The thus constructed elastomeric shock and vibration isolator can provide the desired additional damping capacity by means of liquid passing through the orifice 7. However, such an isolator has the disadvantage that deformation of the ring shaped rubber member 6 in the manner shown by the dotted lines in FIG. 1 reduces the amount of liquid passing through the orifice 7, resulting in insufficient additional damping capacity.

To overcome these defects one or more metal rings have been applied to the outer circumference of the ring shaped rubber member 6 to provide sufficient damping capacity. However, increasing the number of metal rings brings a higher dynamic spring constant, which is undesirable due to interior vehicular noise considerations, such as booming noise. Furthermore, no elastomeric shock and vibration isolator which can properly be controlled to take into account the position and condition of application has been found among shock and vibration isolators of the type shown in FIG. 1 or having a simple ring shaped rubber member with a space inside, i.e., without elements 8 and 9.

Figure 2:
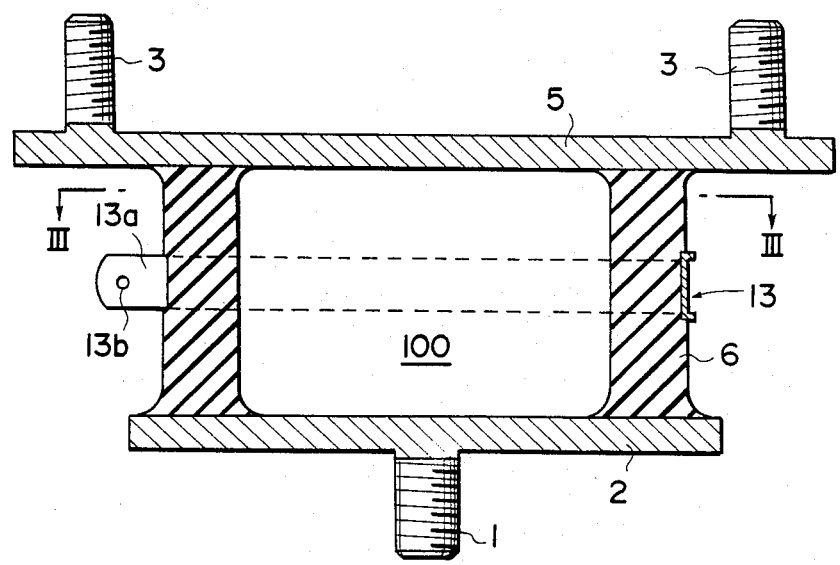
FIG. 2 is a sectional view showing an embodiment of the present invention.
Figure 3:
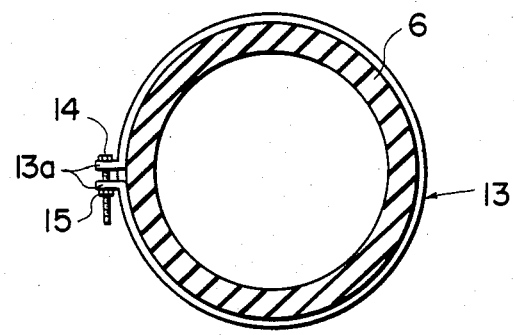
FIG. 3 is a sectional view along the line III—III of FIG. 2.

FIG. 2 shows a first embodiment of an elastomeric shock and vibration isolator according to the present invention wherein a lower plate 2 to which a mounting bolt 1 is attached and an upper plate 5 to which assembly bolts 3 are attached are arranged at predetermined positions in a mold for vulcanizing rubber so that a ring shaped rubber member 6 can be formed between the lower and upper plates 2 and 5 by vulcanizing. Gas is sealed within the space 100 surrounded by the upper and lower plates 5 and 2 and the ring shaped rubber member 6. On the outer circumference of above mentioned ring shaped rubber member 6, a tightening ring 13, which can adjust the tightening force against the ring shaped rubber member 6, is fitted. Both end terminals of this tightening ring 13 are bent outwardly to face each other. The bent portions act as tightening members 13a by having holes 13b through which a bolt 14 is inserted as shown in FIG. 3, and whereby the tightening force can be adjusted by adjusting a nut 15. In this first embodiment, although only one tightening ring 13 is shown, two or more rings can be used. As is further apparent, the tightening ring 13 could be formed of two semicircular strips having the tightening members 13a formed at both ends thereof.

A large tightening force of the tightening ring 13 provides a large damping capacity for low frequency vibrations, while it is possible to decrease the dynamic spring constant for high frequency vibrations by decreasing the tightening force.

Figure 4:
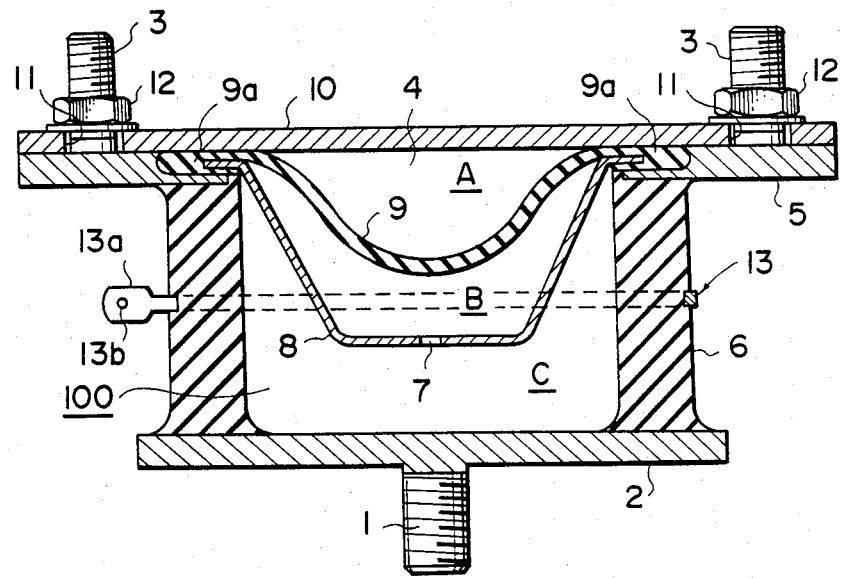
FIG. 4 is a sectional view showing another embodiment of the present invention.

FIG. 4 shows a second embodiment of an elastomeric shock and vibration isolator according to the present invention, containing liquid. This embodiment is similar to the elastomeric shock and vibration isolator of FIG. 1, in that a lower plate 2 to which a mounting bolt 1 is attached and an upper plate 5 to which assembly bolts 3 are attached and having a central opening 4 are arranged at predetermined positions in a mold for vulcanizing rubber, so that a cylindrical ring shaped rubber member 6 may be formed by means of vulcanizing. The ring shaped rubber member 6 has approximately the same internal diameter as the opening 4 of the upper plate 5. Further, it is also similar to the elastomeric shock and vibration isolator shown in FIG. 1, in that it includes a divider 8 having an orifice 7, a flexible rubber diaphram 9, a lid 10, holes 11 and nuts 12, defining a gas chamber A and liquid chambers B and C inside of a space 100.

On the outer circumference of the ring shaped rubber member 6, a tightening ring 13, which can adjust the tightening force on the ring shaped rubber member 6, is inserted. This tightening ring 13 has tightening members 13a and holes 13b similar to those of the above mentioned first embodiment, and adjustment of the tightening force is thus achieved by adjusting the distance between the tightening members 13a. A large tightening force of the tightening ring 13 allows less deflection of the ring shaped rubber member 6, whereby the amount of liquid passing through the orifice 7 decreases. Also, decreasing the tightening force makes the dynamic spring constant lower at a high frequency.

Figure 5:
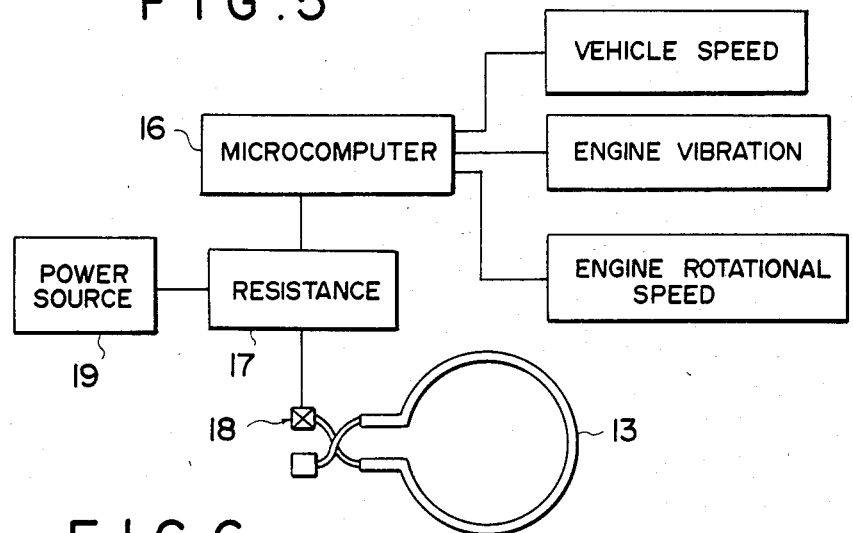
FIG. 5 is a schematic view showing one embodiment of adjusting means for the tightening force of the tightening ring.

FIG. 5 shows one embodiment of means for adjusting the tightening force of the tightening ring 13 which is useful in automobile engine mount applications. In this arrangement, the engine rotational speed, vehicle speed and engine vibration are input to a microcomputer 16, which controls a resistor 17 according to a predetermined program to adjust the electric current flowing from a power supply 19 to an electromagnet 18 operable on the tightening ring 13 to optimize performance of the isolator against vehicle body vibration such as shake (low frequency vibration) and the like or interior noise of the automobile such as booming noise and the like. The tightening force of the tightening ring 13 is varied to optimize engine mount performance by adjusting the current flowing to the electromagnet 18. In other words, for low frequencies, a large loss factor is obtainable by increasing the bulk modulus with increased tightening force of the tightening ring 13, whereas for high frequencies, a small dynamic spring constant is obtainable by decreasing the bulk modulus with decreased tightening force of the tightening ring 13. A large bulk modulus (that is, a high pressure increase per unit volume change) means there is a tendency towards a pressure increase, whereby in the elastomeric shock and vibration isolator containing liquid (as shown in the second embodiment), a large damping capacity can be attained, because of the decreased flow rate through the orifice 7.

Figure 6:
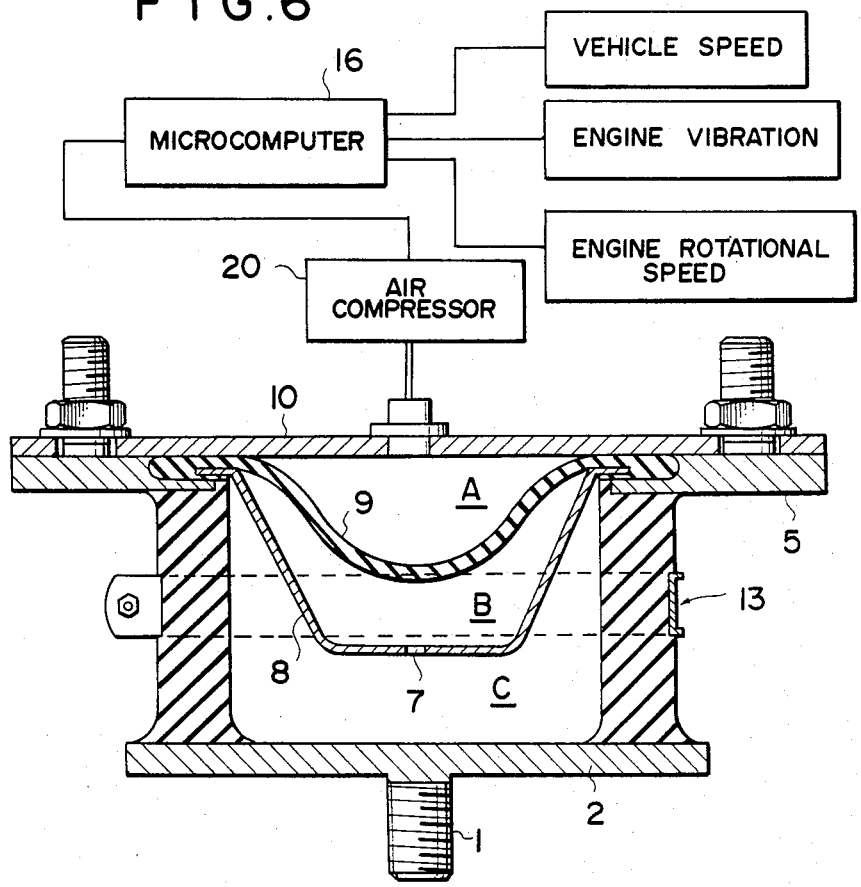
FIG. 6 is a schematic view showing one embodiment of adjusting means for pressure in a gas chamber.

FIG. 6 illustrates a further embodiment to help provide proper characteristics for an engine mount. The elastomeric shock and vibration isolator shown in FIG. 6 is similar to the second embodiment described above, except that the pressure in the gas chamber A, i.e., the back pressure, is adapted to be changed by means of a compressor 20. The operation of the air compressor 20 is controlled by the microcomputer 16 on the basis of the engine rotational speed, vehicle speed and engine vibration, much as in the embodiment shown in FIG. 5. As is apparent, this pressure adjusting means may also be applied to the elastomeric shock and vibration isolator described in the first embodiment (FIG. 2).

In any of the embodiments mentioned above, it is preferable to use a synthetic resin or light metal such as aluminum as the material of the tightening ring 13, rather than iron, though iron may be used. Vibrations caused by explosions in the engine (at rates about 3 to 6 times the engine rotational speed) become a problem in engines having six cylinders, for example, so damping performance up to 500 Hz–600 Hz is essential. An elastomeric shock and vibration isolator as described above using an iron tightening ring 13 resonates at frequencies over 100 Hz, producing the disadvantage of a large transfer rate of vibration due to the large dynamic spring constant around a resonance point. As a result of various experiments, the inventors have found that the disadvantages of an iron tightening ring may be avoided by using a light weight tightening ring 13 made of synthetic resin or a light metal. The lighter tightening rings 13 shift the resonant frequency point to a higher frequency. Thus, the transfer rate of engine vibration can be restricted to a lower value.

What is claimed is:

1. An elastomeric shock and vibration isolator having a ring shaped rubber member in which a space is formed, said isolator comprising:
   a divider disposed in said space for dividing said space into two sealed chambers filled with fluid;
   an orifice formed in said divider interconnecting said chambers;
   at least one tightening ring fitted on the outer circumference of said ring shaped rubber member; and
   means for adjusting the tightening force of said tightening ring against said ring shaped rubber member to control the amplitude of the deflection of said ring shaped rubber member, whereby the damping force and dynamic spring constant of the isolator can be varied.

2. An elastomeric shock and vibration isolator according to claim 1, further comprising a flexible diaphragm forming an additional independent chamber in one of said two chambers, and wherein said two chambers are filled with liquid and said additional chamber is filled with gas.

3. An elastomeric shock and vibration isolator according to claim 1, wherein said at least one tightening ring is made of synthetic resin.

4. An elastomeric shock and vibration isolator according to claim 2, wherein said at least one tightening ring is made of synthetic resin.

5. An elastomeric shock and vibration isolator according to claim 1, wherein said at least one tightening ring is made of light metal.

6. An elastomeric shock and vibration isolator according to claim 2, wherein said at least one tightening ring is made of light metal.

7. An elastomeric shock and vibration isolator having a space formed therein, comprising:
   a lower plate;
   an upper plate;
   a ring shaped rubber member arranged between said lower and upper plates and sealably connected thereto;
   at least one tightening ring on an outer circumference of said ring shaped rubber member; and
   adjusting means for adjusting a tightening force of said tightening ring against said ring shaped member to adjust the damping force and dynamic spring constant of the isolator.

8. An elastomeric shock and vibration isolator according to claim 7, wherein said at least one tightening ring is made of synthetic resin.

9. An elastomeric shock and vibration isolator according to claim 7, wherein said at least one tightening ring is made of light metal.

10. An elastomeric shock and vibration isolator having a space formed therein, comprising:
    a lower plate;
    an upper plate having a central opening;
    a ring shaped rubber member extending between and sealably connected to said plates;
    a lid adjacent to said upper plate and, in conjunction with said rubber member and plates, defining said space;
    a flexible rubber diaphragm extending within said space and, in conjunction with said lid, defining within said space a sealed gas chamber, said gas chamber being filled with gas;
    a divider extending within a portion of said space outside of said gas chamber and, in conjunction with said diaphragm, rubber member and plates, defining two liquid chambers in said space, said divider having an orifice formed therein interconnecting said liquid chambers, said liquid chambers being filled with liquid and one of said liquid chambers being adjacent to said gas chamber and separated therefrom by said diaphragm;
    a least one tightening ring fitted on an outer circumference of said rubber member; and
    adjusting means for adjusting a tightening force of said at least one tightening ring against said rubber means to adjust the damping force and dynamic spring constant of said isolator.

11. An elastomeric shock and vibration isolator according to claim 10, wherein said at least one tightening ring is made of synthetic resin.

12. An elastomeric shock and vibration isolator according to claim 10, wherein said at least one tightening ring is made of light metal.

13. The elastomeric shock and vibration isolator according to claim 1, wherein said at least one tightening ring is formed to correspond in shape to said ring shaped rubber member and has outwardly bent portions at ends thereof by means of which bent portions said adjusting means can adjust said tightening force of said tightening ring.

14. The elastomeric shock and vibration isolator according to claim 2, wherein said at least one tightening ring is formed corresponding to said ring shaped rubber member and has outwardly bent portions at ends thereof by means of which bent portions said adjusting means can adjust said tightening force of said tightening ring.

15. The elastomeric shock and vibration isolator according to claim 3, wherein said at least one tightening ring is formed corresponding to said ring shaped rubber member and has outwardly bent portions at ends thereof by means of which bent portions said adjusting means can adjust said tightening force of said tightening ring.

16. The elastomeric shock and vibration isolator according to claim 4, wherein said at least one tightening ring is formed corresponding to said ring shaped rubber member and has outwardling bent portions at ends thereof by means of which bent portions said adjusting means can adjust said tightening force of said tightening ring.

17. The elastomeric shock and vibration isolator according to claim 1, wherein said at least one tightening ring comprises two semicircular portions corresponding in shape to said ring shaped rubber member and said adjusting means is connected to both ends of said two semicircular portions to adjust said tightening force.

18. The elastomeric shock and vibration insolator according to claim 2, wherein said at least one tightening ring comprises two semicircular portions corresponding in shape to said ring shaped rubber member and said adjusting means is connected to both ends of said two semicircular portions to adjust said tightening force.

19. The elastomeric shock and vibration isolator according to claim 3, wherein said at least one tightening ring comprises two semicircular portions corresponding in shape to said ring shaped rubber member and said adjusting means is connected to both ends of said two semicircular portions to adjust said tightening force.

20. The elastomeric shock and vibration isolator according to claim 4, wherein said at least one tightening ring comprises two semicircular portions corresponding in shape to said ring shaped rubber member and said adjusting means is connected to both ends of said two semicircular portions to adjust said tightening force.

* * * * *